(12) United States Patent
Houlachi et al.

(10) Patent No.: US 6,228,270 B1
(45) Date of Patent: May 8, 2001

(54) PROCESS FOR REDUCING SELENIUM AND MERCURY FROM AQUEOUS SOLUTIONS

(75) Inventors: George Houlachi, Ile Perrot; Gary Monteith, Valleyfield; Lucy Rosato, Town of Mount Royal, all of (CA)

(73) Assignee: Noranda Inc. (CA)

( * ) Notice: Subject to any disclaimer, the term of this patent is extended or adjusted under 35 U.S.C. 154(b) by 0 days.

(21) Appl. No.: 09/329,353

(22) Filed: Jun. 10, 1999

(51) Int. Cl.$^7$ .................................................. C02F 1/62
(52) U.S. Cl. .................. 210/719; 210/724; 210/726; 210/911; 210/912; 210/914; 423/101; 423/509
(58) Field of Search .................. 210/719, 724, 210/725, 726, 727, 911, 912, 914; 423/101, 508–510

(56) References Cited

U.S. PATENT DOCUMENTS

| | | | |
|---|---|---|---|
| 3,577,216 | 5/1971 | Weiss et al. | 23/50 |
| 3,677,696 | 7/1972 | Bryk et al. | 23/2 |
| 3,695,838 | 10/1972 | Knepper et al. | 425/106 |
| 3,740,331 | * 6/1973 | Anderson et al. | 210/726 |
| 3,933,635 | 1/1976 | Marchant | 210/50 |
| 3,959,097 | 5/1976 | Queneau et al. | 204/108 |
| 3,966,889 | 6/1976 | Kakuta et al. | 423/510 |
| 4,128,617 | 12/1978 | Deguire et al. | 423/106 |
| 4,330,508 | 5/1982 | Weir et al. | 423/42 |
| 4,377,556 | 3/1983 | Hofirek | 423/42 |
| 4,579,726 | 4/1986 | Kuivala et al. | 423/531 |
| 4,599,177 | * 7/1986 | Hayashi et al. | 210/718 |
| 5,200,082 | 4/1993 | Olsen et al. | 210/667 |
| 5,200,088 | * 4/1993 | Pilznienski | 210/720 |
| 5,298,168 | * 3/1994 | Guess | 210/713 |
| 5,330,658 | * 7/1994 | Grant et al. | 210/914 |
| 5,397,478 | * 3/1995 | Pal et al. | 210/710 |
| 5,419,834 | * 5/1995 | Straten | 210/914 |
| 5,660,735 | * 8/1997 | Coltrinari et al. | 210/914 |

* cited by examiner

Primary Examiner—Peter A. Hruskoci
(74) Attorney, Agent, or Firm—Katten Muchin Zavis

(57) ABSTRACT

The present invention relates to an apparatus for removing volatile impurities such as mercury and selenium from a weak acid solution resulting from scrubbing gases created in the production of sulfuric acid by roasting of sulfide concentrates. The apparatus comprises a calcine filtering unit for removing calcine from the weak acid solution, a sodium sulfide mixing unit for precipitating mercury from the weak acid solution, a sodium dithionite mixing unit for precipitating selenium from the weak acid solution, and a mercury-selenium filtering unit for filtering the precipitated mercury and selenium from the weak acid solution. The present invention further relates to a treatment plant utilizing such an apparatus, a process for removing volatile impurities from a weak acid solution, and a selenium cake obtained by utilizing the resent invention.

13 Claims, 9 Drawing Sheets

Mercury Selenium Removal Project: New Plant Option

PROCESS FOR REDUCING SELENIUM AND MERCURY FROM AQUEOUS SOLUTIONS

BACKGROUND OF THE INVENTION

1. Field of the Invention

The present invention relates to a process for removing impurities from the effluent produced during the washing of the hot gases generated during a sulfide concentrate roasting process, an apparatus for performing the process, and a plant utilizing the process. More particularly, the invention relates to a process of removing mercury and selenium impurities from a weak acid solution by precipitating them using sodium sulfide and sodium dithionite, respectively. The precipitates are then filtered from the effluent, which is then substantially free of impurities.

2. Description of the Related Art

During the roasting of sulfide concentrates, such as zinc or copper, the sulfur dioxide generated by heating the calcine is treated in an acid plant to be converted to the sulfuric acid end product. The sulphur dioxide gas produced in the roasting section is scrubbed to remove traces of volatile impurities such as selenium and mercury. These impurities are removed in an acidic solution, which may be reused for the scrubbing operation several times until the concentrations of selenium, mercury, and sulfuric acid in the solution reach levels too high for further recycling. Typically, at this point the solution is neutralized, the solids are removed and stored in a holding pond, and the effluent is returned to waterways. Due to increased environmental concerns, a need has developed for a process that will enable acid plants to remove additional selenium and mercury from the acidic solution before the neutralization step, thereby reducing the amounts of these impurities released into the environment.

It is known in the art to wash hot gases produced in various industrial processes to remove contaminants such as selenium and mercury. In U.S. Pat. No. 3,966,889, selenium is absorbed by an alkali metal sulfite or bisulfite from hot gas. The gas is then cooled and humidified, and is filtered through a glass fiber filter to remove any remaining selenium. The selenium may then be recovered from the absorbing solution by precipitating with $SO_2$ as a reducing agent, and allowing the reaction mixture to stand for 3–5 hours at 50–90° C. This is followed by another filtration step to remove the precipitate from the solution.

In U.S. Pat. No. 3,677,696 hot gases containing mercury are washed with sulfuric acid at 70–250° C. Mercury and selenium may be found in the wash liquid, but no further process is described to remove these contaminants from the wash liquids.

In U.S. Pat. No. 4,579,726 hot gases are cooled and scrubbed with a sulfuric acid mist to separate mercury from the hot gases in the form of sulfatized mercury. The mist containing the sulfatized mercury is then separated from the hot gases, but no method for further removing the mercury from the mist is disclosed.

Methods of removing selenium and mercury from aqueous solutions produced in industrial processes are also known. U.S. Pat. No. 3,695,838 discloses a method of precipitating mercury from solution using $H_2S$ gas, or in the alternative, by reduction with metals such as zinc, aluminum, and iron, or by reducing with a low molecular weight aldehyde.

In U.S. Pat. No. 3,577,216 selenium is recovered to be reused as a catalyst in organic oxidation reactions by using an oxide, hydroxide, or metal salt to precipitate the selenium from an acidic solution as a metallic selenite.

In U.S. Pat. No. 3,933,635 selenium is precipitated from an acidic solution using powdered zinc, aluminum or iron at a temperature of 25–85° C., at pH 1–4, for 1–10 minutes.

In U.S. Pat. No. 3,959,097 trace amounts of selenium are precipitated from an acidic solution using a metal hydroxide in the presence of a sulfide at 85° C. or greater, under a pressure of 160 psig or greater.

U.S. Pat. No. 5,200,082 teaches a process of removing selenium from an acidic solution by filtering the solution, heating it, adding powdered iron in the presence of elemental sulfur as a reducing agent, agitating the mixture, and oxidizing the solution with continued agitation. This results in precipitation of the selenium from the solution.

U.S. Pat. No. 4,330,508 discloses a process of removing selenium from an acidic copper sulfate solution by passing the solution through a tubular member in a plug flow manner, and injecting $SO_2$ or a sulfite solution (which may be sodium sulfite or sodium hydrogen sulfite). This process normally does not allow enough selenium to be removed to produce copper by electrowinning that is free of selenium contamination. The '508 patent also discloses that selenium may be precipitated using sodium sulfite as a reductant at atmospheric pressure.

U.S. Pat. No. 4,377,556 teaches removal of selenium from acidic copper sulfate solution by reacting the solution with a stoichiometric excess of $SO_2$ or sulfite at a temperature of at least 140° C., and then passing oxygen into the solution to oxidize all dissolved cuprous ions to cupric ions, reducing the likelihood that copper will precipitate from solution when it is cooled. The selenium reducing sulfite may include bisulfite and pyrosulfite ions.

The above-described methods have several disadvantages, including the use of costly powdered metals as reducing agents, difficulty in reducing the amount of selenium and mercury in solution to acceptably low levels, and the expense of providing equipment capable of carrying out the reactions, particularly where the reactions require the use of high temperatures and pressures. These methods can also present significant hazards due to the possibility of igniting volatile selenium hydride and arsenic hydride gases.

It is desirable to develop a process for removing selenium and mercury from solutions produced during the roasting of sulfide concentrates to produce sulfuric acid, or during any other industrial process, that is easy to perform, cost-effective, and prevents further environmental damage due to contamination of waterways with selenium and mercury. None of the above-mentioned techniques addresses a method of removing mercury and selenium from acidic solutions using sodium sulfide to remove the mercury, or sodium dithionite (also known as sodium hydrosulphite) to remove selenium, as are disclosed in the present invention.

SUMMARY OF THE INVENTION

It is an object of the invention to create an apparatus for removing volatile impurities from a weak acid solution. A calcine filtering unit removes calcine from the weak acid solution. A sodium sulfide mixing unit is used to precipitate mercury from the solution, and a sodium dithionite mixing unit is used to precipitate selenium from the solution. A mercury and selenium filtering unit is then used to filter the precipitated mercury and selenium from the weak acid solution.

To this end, one aspect of the present invention comprises an apparatus for removing metal impurities from a weak acid solution. The sodium sulfide mixing unit removes mercury from the solution. The sodium dithionite mixing unit removes selenium from the solution, one or more filtering units filter out the solid mercury and selenium.

In another aspect of the present invention, an apparatus for removing selenium impurities from a weak acid solution comprises a sodium dithionite mixing reactor to solidify the selenium in the solution and a filter to filter the solid selenium from the solution.

According to another aspect of the present invention, a treatment plant for removing impurities from a weak acid solution, resulting from scrubbing gases in production of sulfuric acid, comprises a reactor for mixing the weak acid solution with sodium dithionite to precipitate dissolved selenium in the solution, and one or more filters to filter solid impurities from the solution.

Yet another aspect of the present invention is directed to a plant for treating a weak acid solution, formed in production of sulfuric acid, that comprises a calcine recycle filtering unit, a sodium sulfide mixing unit, a sodium dithionite mixing unit, and a mercury-selenium filtering unit.

A further aspect of the present invention is directed toward a concentrated selenium cake comprising selenium precipitated by sodium dithionite.

A still further aspect of the present invention is directed toward a concentrated selenium cake comprising selenium solids precipitated from a weak acid solution resulting from scrubbing gases in production of sulfuric acid.

Another aspect of the present invention is directed to a process for removing impurities from a weak acid solution. This process comprises the steps of filtering calcine to remove calcine solids from the weak acid solution, mixing the weak acid solution with sodium sulfide to precipitate mercury from the weak acid solution, mixing the weak acid solution with sodium dithionite to precipitate selenium from the weak acid solution, and filtering mercury and selenium solids from the weak acid solution to form a selenium-rich cake.

An additional aspect of the present invention is directed to a process for removing volatile impurities from a weak acid solution. The process comprises the steps of mixing the weak acid solution with sodium dithionite to precipitate selenium from the weak acid solution, and filtering solids from the weak acid solution to form a selenium rich cake.

Another aspect of the present invention is directed to a process for treating a weak acid solution, resulting from scrubbing gases produced in making sulfuric acid. This process comprises the steps of mixing the weak acid solution with sodium sulfide, mixing the weak acid solution with sodium dithionite, and filtering the weak acid solution.

A further aspect of the present invention relates to a process for treating a weak acid solution, resulting from scrubbing gases produced in roasting sulfide concentrate to form sulfuric acid. This process comprises the steps of filtering calcine from the weak acid solution, mixing the weak acid solution with sodium sulfide, mixing the weak acid solution with sodium dithionite, filtering mercury and selenium solids from the weak acid solution, and sending the treated weak acid solution to effluent treatment.

An additional aspect of the present invention is a process for removing selenium from an acidic scrubbing solution, used to scrub impurities from a sulfide concentrate roasting gas. This process comprises the steps of treating the solution with sodium sulfide to precipitate a first portion of the selenium, treating the sodium sulfide treated solution with sodium dithionite to precipitate a second portion of selenium, and filtering the sodium dithionite treated solution to produce a cake containing the precipitated first and second portions of selenium.

The invention is described in more detail below with reference to the accompanying drawings.

DESCRIPTION OF THE PREFERRED EMBODIMENTS

The process of the present invention is comprised of a series of several steps, as will described in detail below.

The first step involves filtering the weak acid produced by scrubbing the gas released by the roasting of the sulfide concentrate. The filtering removes the excess calcine solids present in the weak acid. Mercuric selenide is removed simultaneously. This step is optional, but is useful in that it prevents high concentrations of calcine from entering the mercury and selenium removal circuits during break-downs of the roaster hot gas precipitators. The filter cake resulting from this filtration step may contain high levels of mercury, depending on the selenium level of the feed material, and can either be disposed of or recycled to the roasters depending on the mercury level. If the mercury level is low, below approximately 5%, recycling is appropriate, if the mercury level is high, above approximately 5%, the cake should not be recycled to prevent introduction of unacceptably high surges of mercury into the hot gases, which may be difficult to remove completely. Table 1, rows 1, 4 and 7 show the amount of volatile impurities remaining after conducting this first filtration step. A comparison with the values of selected volatile impurities present in the initial weak acid solution shows that some of these elements are removed, but that unacceptably high levels of these contaminants remain in solution.

In the second step, the weak acid solution is treated with sodium sulfide to precipitate the remaining mercury from the solution in the form of HgS. Some selenium is also precipitated during this step when the sodium sulfide is added, but enough selenium can remain in solution that additional treatment is required to reduce the amount of selenium to acceptable levels. A slight excess of sodium sulfide is added based on the amount of mercury present in the weak acid solution, and the amount of volatile impurities present in the roaster system. There are presented in FIGS. 1–8. This information regarding temperature, reagent concentration, and acidity may be used to aid in optimizing reaction conditions within the system.

Figure 1:
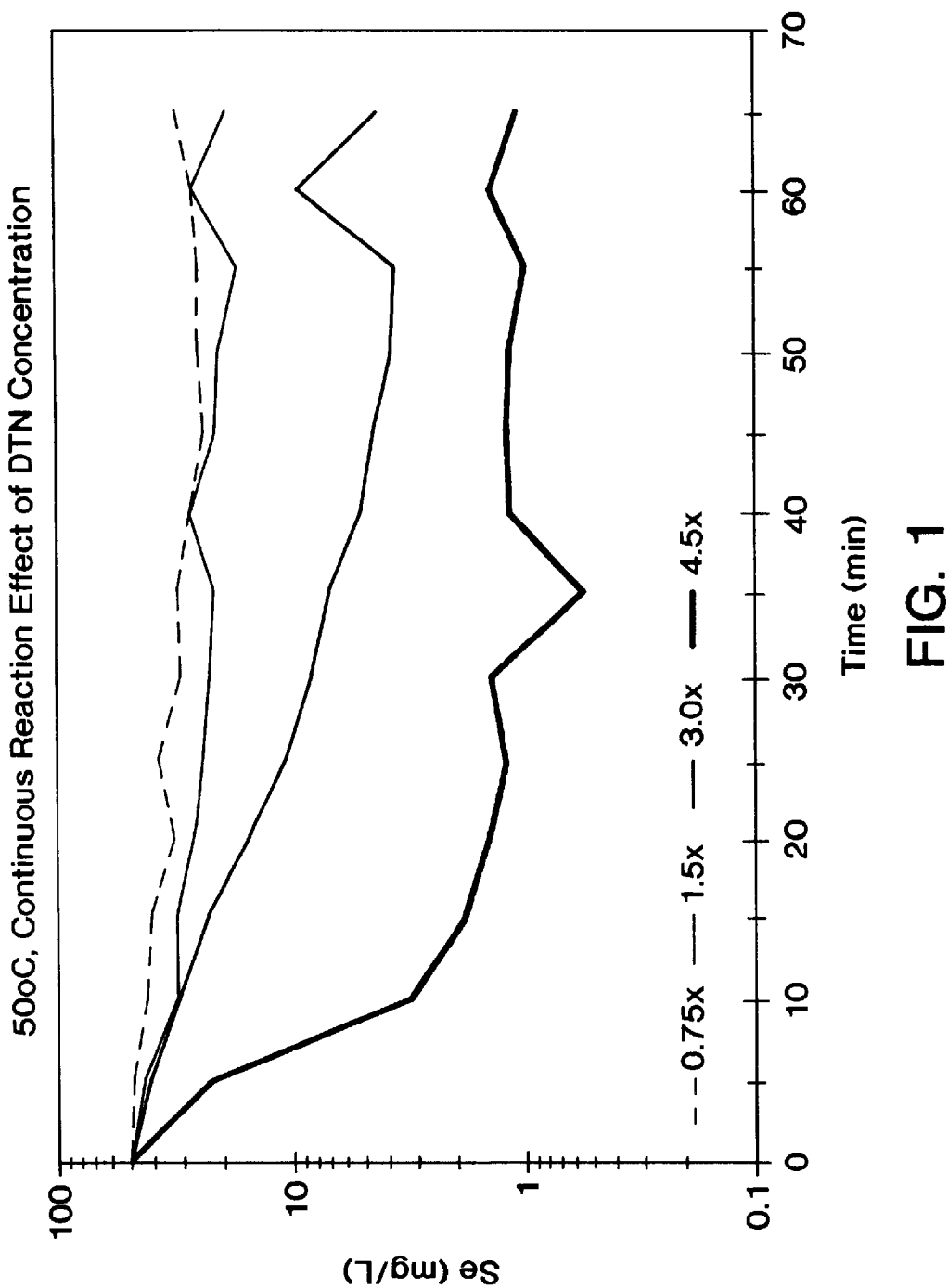
FIG. 1 is a graph comparing the effect of the addition of varying quantities of dithionite upon the higher concentrations of selenium in solution over time at 50° C.

FIG. 1 illustrates the effect of varying the amount of a single dose of dithionite added to a weak acid solution containing selenium at a temperature of 50° C. as a function of time. Addition of more dithionite, measured in molar

TABLE 1

Removal of selenium and mercury using sodium sulfide and sodium dithionite.
Results of plant tests

| | 1 Conditions | 2 Sample | 3 Temp. Celcius | 4 $H_2SO_4$ g/l | 5 Se mg/l | 6 Zn mg/l | 7 Cd mg/l | 8 Cu mg/l | 9 As mg/l | 10 Bl mg/l | 11 Hg mg/l | 12 Fe mg/l | 13 Pb mg/l | 14 Te mg/l | 15 Tl mg/l |
|---|---|---|---|---|---|---|---|---|---|---|---|---|---|---|---|
| 1 | First filtration | Weak acid | 17 | 26 | 13.6 | 324 | 4.5 | 2.3 | 8.4 | 0.06 | <0.01 | 104 | 5.3 | 0.06 | 0.06 |
| 2 | | After $Na_2S$ | 54 | | 1.9 | 330 | 4.4 | 0.34 | 7.4 | <0.01 | <0.01 | 103 | 5.6 | <0.01 | 0.04 |
| 3 | Second filtration | After Dithionite | 54 | | <0.01 | 329 | 4.8 | <0.01 | <0.1 | 0.13 | <0.01 | 117 | 3.4 | <0.01 | <0.01 |
| 4 | First filtration | Weak acid | 13 | 11 | 29.3 | 290 | 3.2 | 0.33 | 6.2 | 0.04 | <0.01 | 95.8 | 5.2 | 0.03 | 0.09 |
| 5 | | After $Na_2S$ | 50 | | 8 | 283 | 3.1 | 0.11 | 5.4 | 0.03 | <0.01 | 93.6 | 5.8 | <0.01 | 0.08 |
| 6 | Second filtration | After Dithionite | 50 | | 0.67 | 281 | 2.2 | <0.01 | 0.76 | 0.03 | <0.01 | 92.5 | 2.1 | <0/01 | <0.01 |
| 7 | First filtration | Weak acid | 14 | 11 | 30.1 | 279 | 3.3 | 0.35 | 6.1 | <0.01 | <0.01 | 96.7 | 4.4 | <0.01 | 0.12 |
| 8 | | After $Na_2S$ | 50 | | 0.69 | 271 | 3 | 0.02 | 3.7 | 0.01 | <0.01 | 93.8 | 4.2 | <0.01 | 0.13 |
| 9 | Second filtration | After Dithionite | 50 | | <0.01 | 270 | 2.5 | <0.01 | <0.1 | <0.01 | <0.01 | 91.4 | 0.84 | <0.01 | <0.01 | commercial mercury measuring devices that may be added to the system to aid in controlling the sulfide addition system. Table 1, rows 2, 5, and 8 show the amount of volatile impurities remaining after precipitating impurities from the solution using sodium sulfide and sodium dithionite. A comparison with the amount of various volatile impurities present in the initial weak acid solution shows a significant reduction, but the level of these contaminants in solution remains unacceptably high for environmental regulation standards.

In cases where the weak acid is highly diluted, which results in a low acidity, metals such as copper, arsenic, bismuth, and zinc will be precipitated with the sodium sulfide. This situation requires use of a slight excess of sodium sulfide above the stoichiometric requirement determined on the basis of the levels of mercury and selenium in solution. The situation where the weak acid is highly diluted could arise in response to a need to keep chlorine or fluorine levels below critical corrosion levels, for example. High dilution of the weak acid may also be required where the weak acid is subject to extra direct cooling (not normally acceptable). Poor precipitator operation may also require extra dilution of solids from scrubbing towers. These deviations in dilution are usually of a short term nature, and do not affect the quality of solution leaving the process if minor corrections are made to the reagent additions.

Step three consists of the addition of sodium dithionite to the solution to cause the precipitation of the remaining selenium in the solution. The amount of sodium dithionite to be added may be controlled by using a feed forward estimation of the remaining selenium after the sodium sulfide precipitation. As an alternative, the possibility of controlling the amount of sodium dithionite to be added with a commercial redox potential meter is envisioned as an embodiment of the present invention. The sodium dithionite can be added either in a solution form or as solid to the aqueous stream. Table 1, rows 3, 6, and 9 show that a further reduction of impurities is obtained after conducting this step in the treatment process.

Further analysis and experimentation with respect to the variables involved in controlling the reaction of the third step of the process according to the present invention are equivalents, results in removal of more selenium from the solution. The greater amounts of dithionite added to the solution result not only in removal of more selenium from the solution, but also a more rapid removal.

Figure 2:
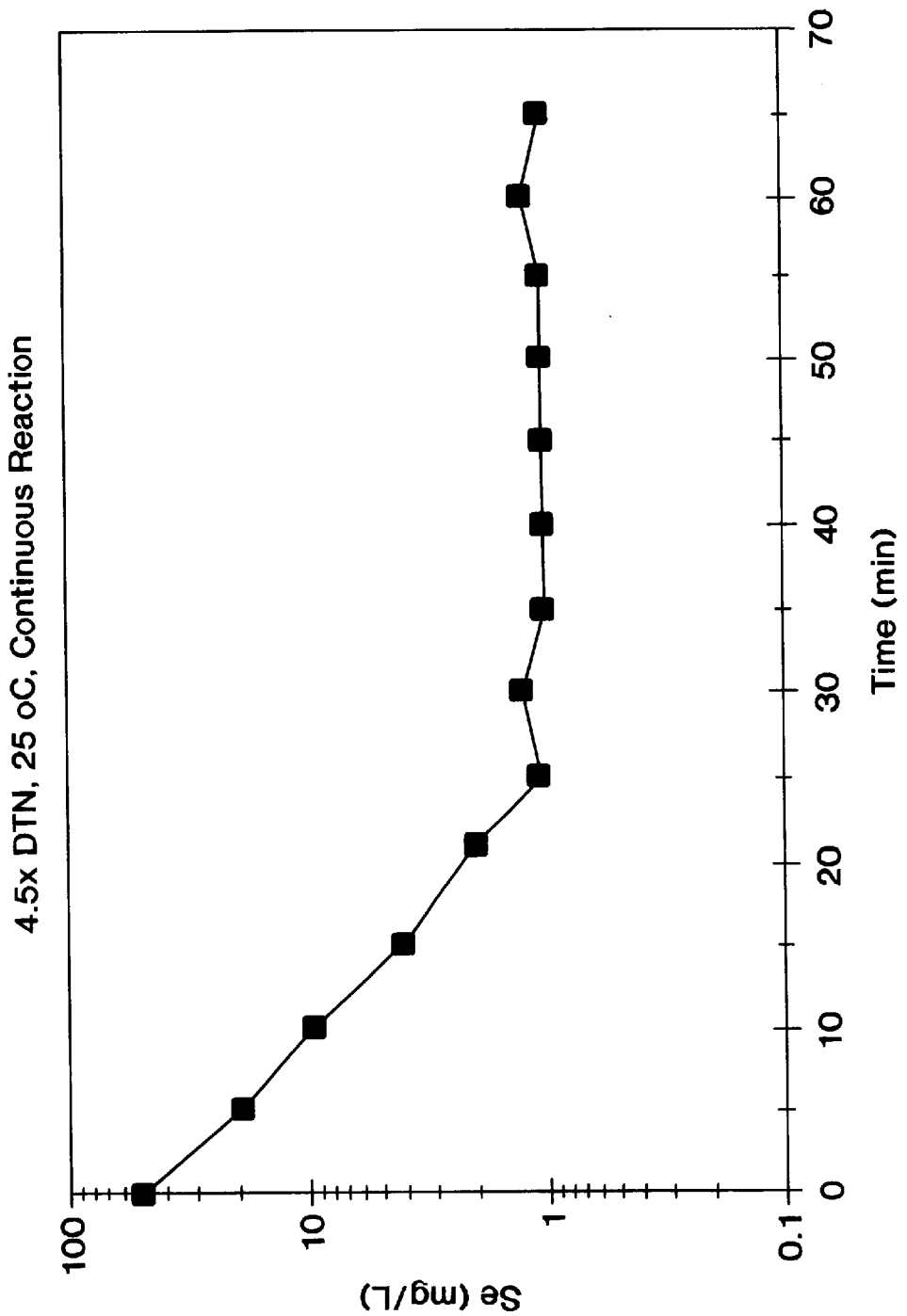
FIG. 2 is a graph illustrating the effect of the addition of 4.5 equivalents of dithionite upon the concentration of selenium in solution at 25° C.
Figure 3:
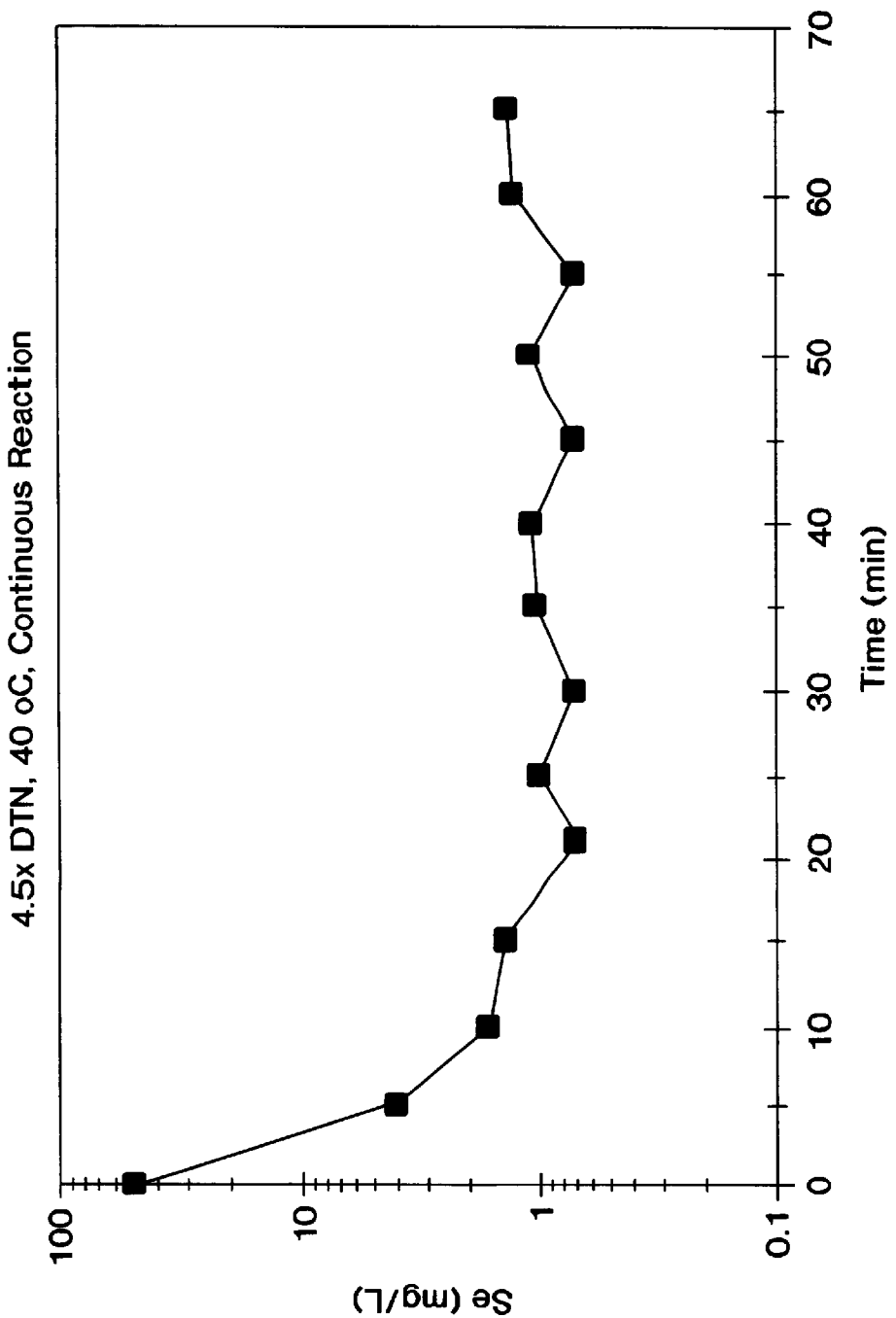
FIG. 3 is a graph illustrating the effect of the addition of 4.5 equivalents of dithionite upon the concentration of selenium in solution at 40° C.

Further testing involved the effectiveness of adding a single dose of 4.5 equivalents of dithionite to a weak acid solution containing selenium, which is maintained at different temperatures. FIGS. 2 and 3 show the effect of maintaining the temperature of the solution at 25 and 40° C., respectively. The results show that higher electrolyte temperatures cause an increase in the rate of selenium removal. Similar results were obtained at a solution temperature of 50° C. (FIG. 1). Therefore, it appears that increased temperatures have a desirable impact on the length of this processing step. This is also useful, because the temperature of the weak acid in the acid processing plant environment averages approximately 55° C., as shown in Table 2. This temperature is also optimal from the standpoint of processing convenience in the plant environment.

Figure 4:
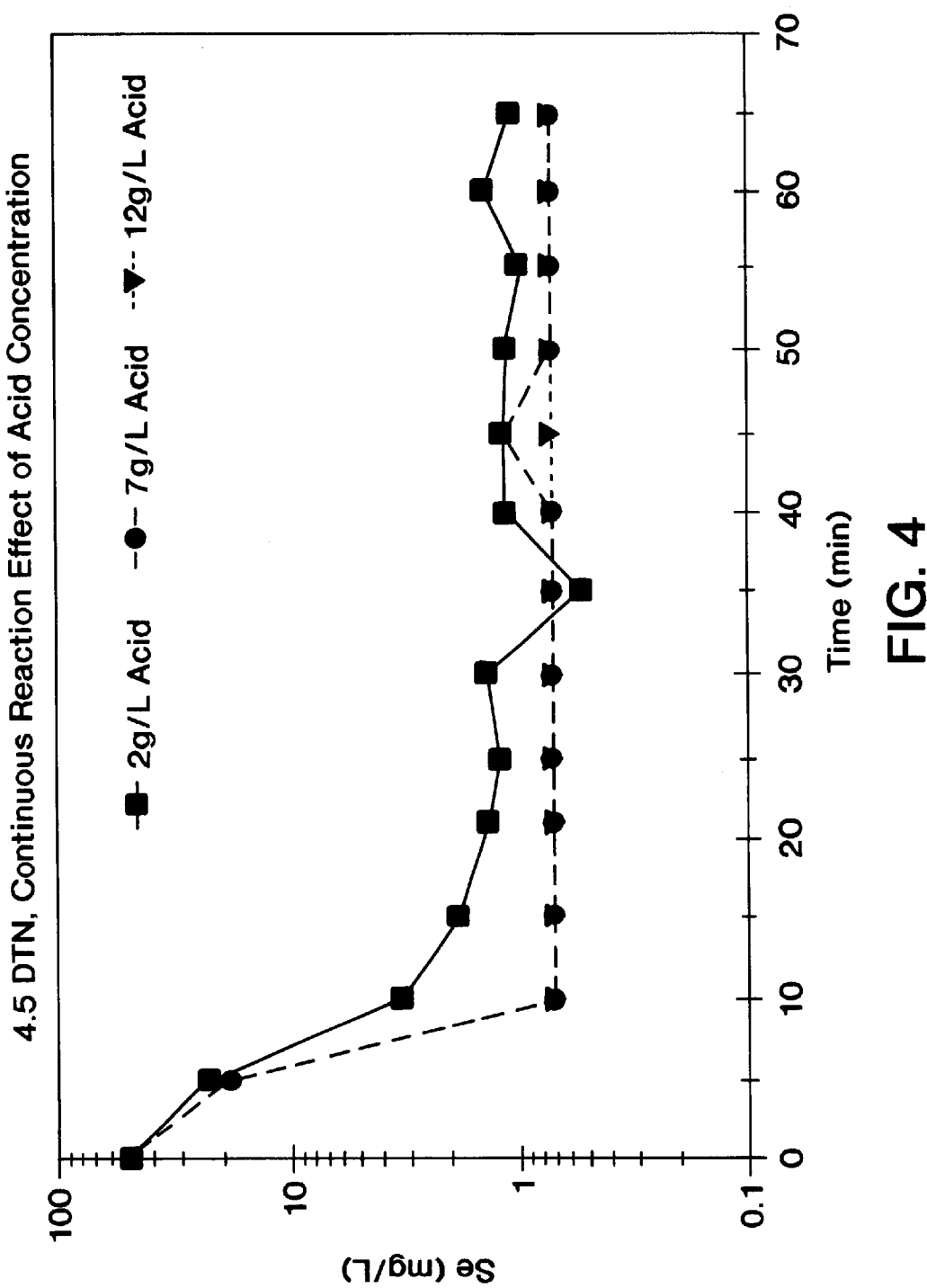
FIG. 4 is a graph comparing the effects of the addition of 4.5 equivalents of dithionite upon the concentration of selenium in a solution of varying acid concentration.
Figure 5:
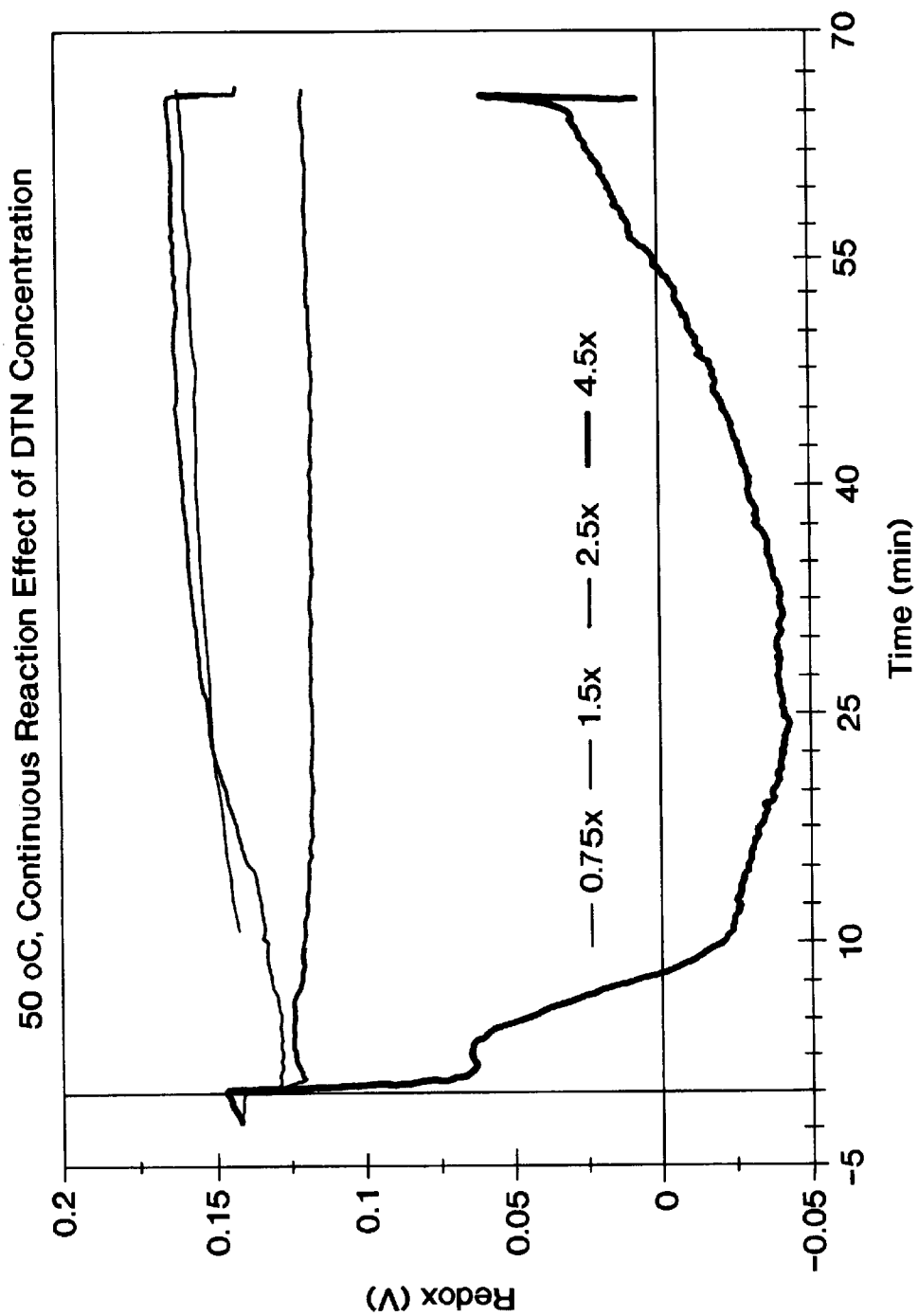
FIG. 5 is a graph comparing the effect of the addition of varying amounts of dithionite upon the redox potential of the reaction mixture over time.
Figure 6:
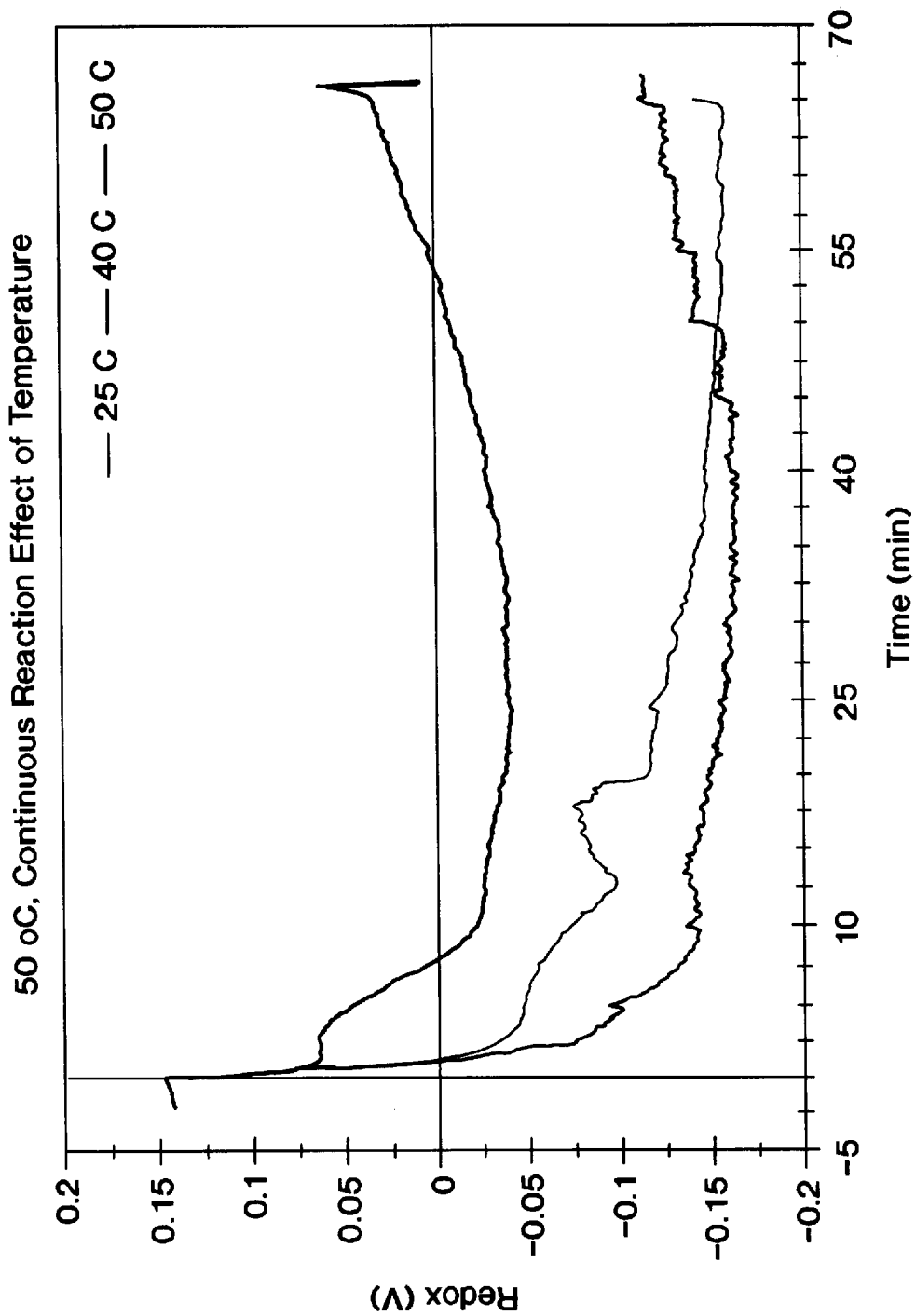
FIG. 6 is a graph comparing the effect of varying the temperature on the redox potential of the reaction mixture over time.
Figure 7:
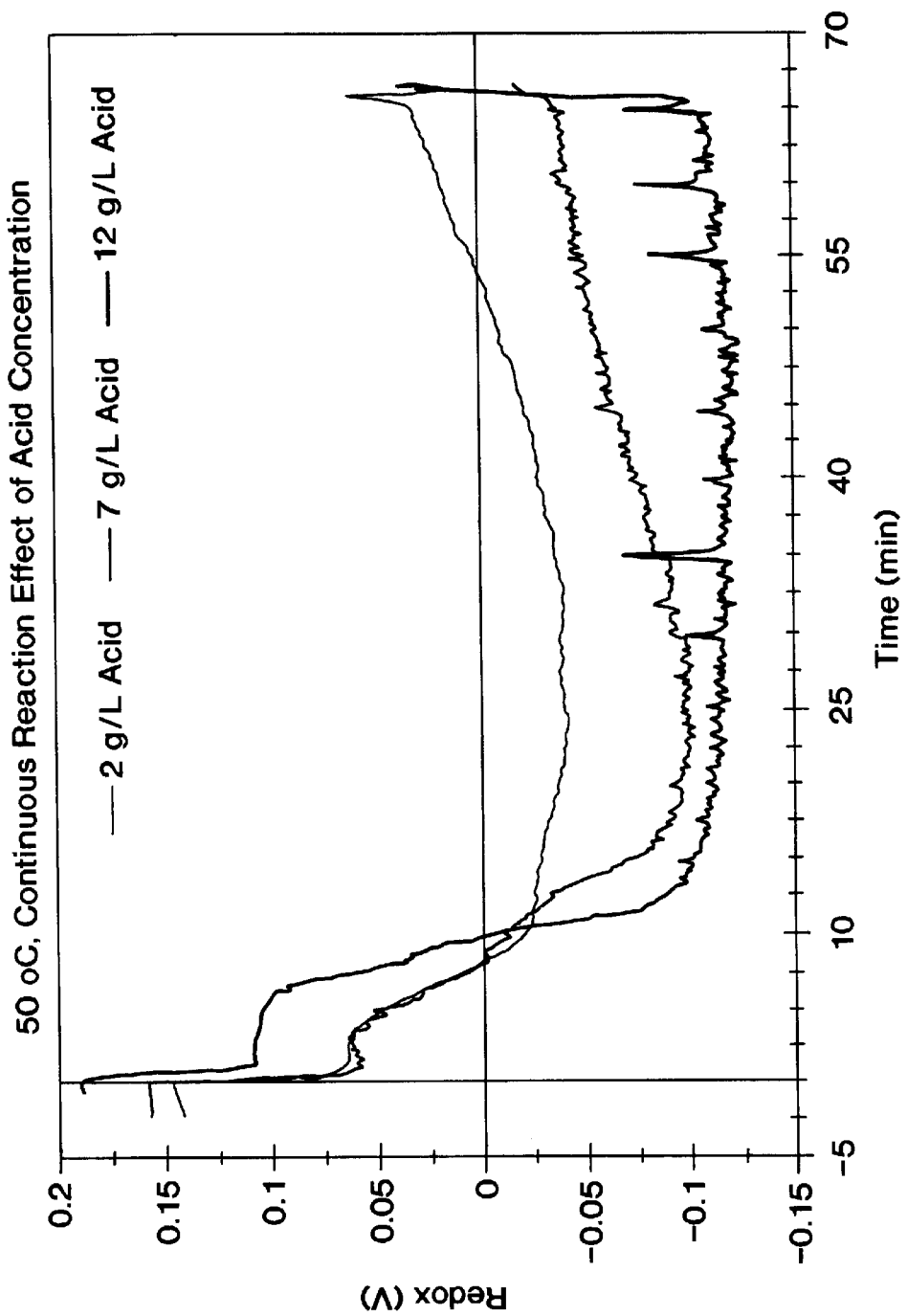
FIG. 7 is a graph comparing the effect of varying the acid concentration on the redox potential of the reaction mixture over time.
Figure 8:
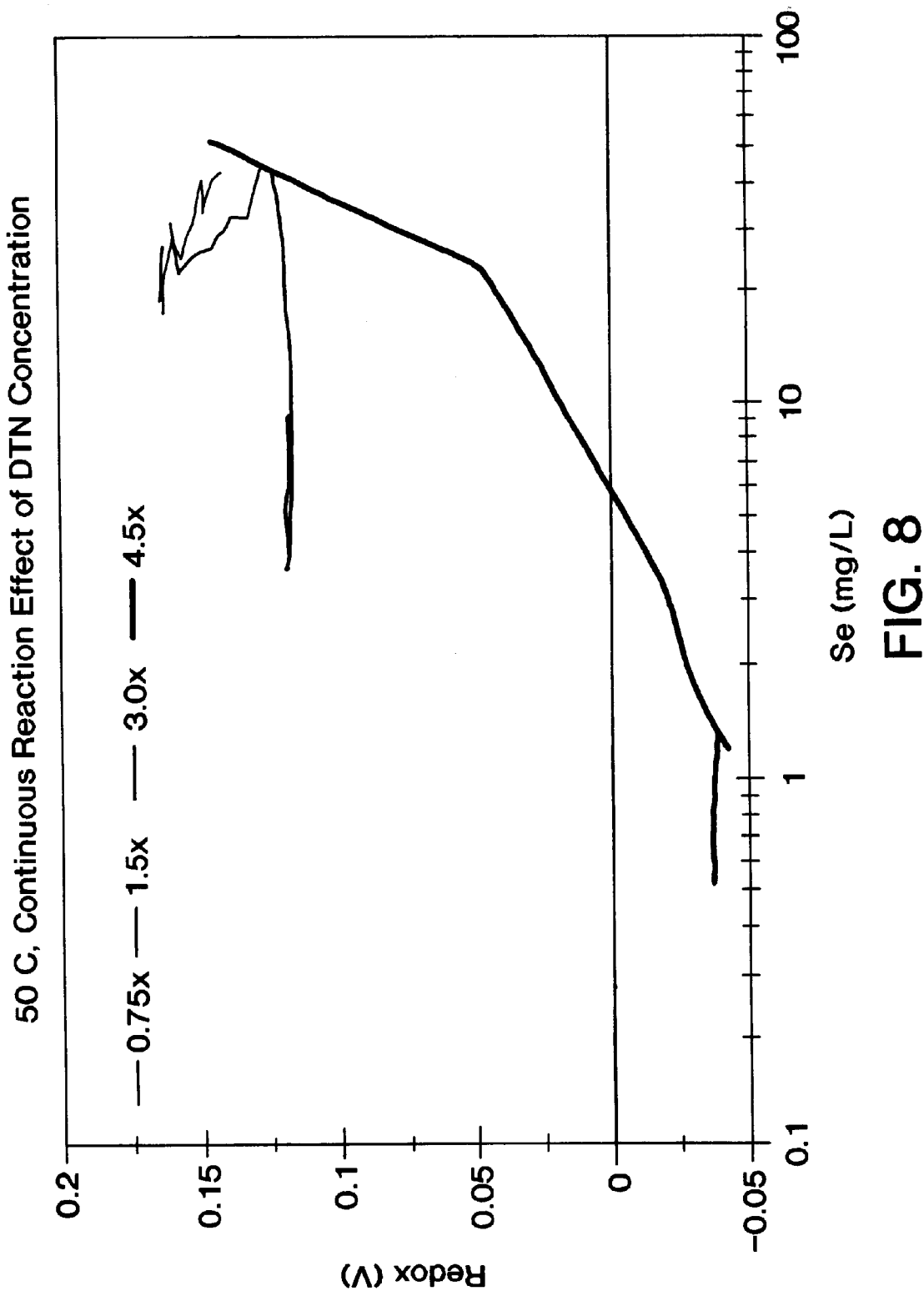
FIG. 8 is a graph comparing the effect of the addition of varying amounts of dithionite upon the redox potential of the reaction mixture as a function of selenium concentration.

The effect of having varying levels of acid present in solution, specifically sulfuric acid, is demonstrated in FIG. 4. Addition of a single dose of 4.5 equivalents of dithionite to a

TABLE 2

| | Acid Plant 1 | Acid Plant 2 | Acid Plant 3 |
|---|---|---|---|
| Weak acid temperature = Daily average Celcius - Period 1 | | | |
| Day 1 | 57 | 57 | 59 |
| Day 2 | 57 | 60 | |
| Day 3 | 60 | 33 | |
| Day 4 | 51 | 51 | |
| Day 5 | 56 | 61 | 60 |
| Weak acid temperature = Daily average Celcius - Period 2 | | | |
| Day 1 | 61 | 60 | 65 |
| Day 2 | 60 | 59 | |
| Day 3 | 50 | 59 | |
| Day 4 | 60 | 59 | |
| Day 5 | 61 | 61 | 60 | solution heated to 50° C. and having 2 g/L of acid results in a slower and less effective reduction in selenium than when added to solutions having 7 or 12 g/L of acid. The removal of selenium from these two solutions appears to be approximately the same. Table 3 shows the acidity levels of solutions from three acid processing plants over time. The data presented in the table show that the acid levels in solution are typically high, and that it is desirable to have a reaction that may be carried out at high acidity levels in order to avoid the necessity of adjusting the acid levels of the solution before processing.

FIGS. 5–8 show changes in the redox potential of the solution as a function of time and selenium concentration. The dithionite present in solution causes a reduction in the redox potential when it is precipitating selenium. The measurement of the redox potential can therefore be used as an indicator to ensure that the process is not experiencing any mechanical or other problems.

It should be noted that when the operating conditions of the system for removing selenium and mercury from the weak acid solution are ideal, i.e. the acidity of the system is high, the amount of dithionite that must be added to the solution to achieve adequate removal of selenium and mercury is very low, and dithionite may, at times, not be needed depending on the desired level that is required by environmental regulation in force. The ability to decrease the use of dithionite from the process according to the present invention while still achieving significant removal of environmental contaminants from washing and effluent solutions also depends on the specific contaminants present. Some contaminants, such as arsenic, require the use of dithionite for removal. The amount of dithionite that must be added to effectively remove contaminants from solution can be considered to vary according to a spectrum: in a solution of high acidity, with no contaminants present that cannot be removed by sodium sulfide, very little or no dithionite is required; in a solution of very low acidity, sodium dithionite is required for removal of selenium. Similarly, in a solution that contains other contaminants in addition to selenium, sodium dithionite is required for removal of the selenium and other contaminants. An amount somewhat above the stoichiometric amount of dithionite corresponding to the amount of contaminants in solution may be required.

The possibility of decreasing the amount of dithionite added to the solution provides a significant cost-benefit for plant operation. Sodium sulfide is a relatively inexpensive reagent, while sodium dithionite is considerably more expensive. Therefore, the ability to decrease the use of dithionite in some circumstances is a significant benefit provided by the present invention.

The fourth step of the process according to the present invention involves filtering the weak acid solution obtained after the precipitation steps outlined above to remove precipitated mercury and selenium. The resulting solution is then sent for acid neutralization treatment and final high pH polishing. Plant tests show that selenium concentrations of approximately <0.01 to 1 mg/L may be obtained after the solution is filtered, as shown in Table 1, column 5.

In the fifth step of the process of the present invention, the solids obtained from the filtration performed in step four are either disposed of or are recycled to the roasters depending on the selenium balance. With low to medium levels of hot gas precipitator slippage, all of the solids may be collected in one filter at the end of the selenium removal process. It is essential to carefully control the transition from the operating filter to a pre-conditioned replacement filter to prevent slippage of selenium solids during the transition. For this reason, the final selenium filter must be restricted by as few solids as possible to reduce the number of filter changes that are required.

TABLE 4

|  | % Zn | % Cd | % S | % Hg | % Se | % Pb |
|---|---|---|---|---|---|---|
|  | First filter press residue | | | | | |
| Month | | | | | | |
| 1 | 3.26 | 0.13 |  | 8.70 | 14.80 | 37.5 |
| 2 | 7.6 | 0.23 |  | 13 | 16.6 | 30.8 |
| 3 | 8.02 | 0.24 |  | 10.70 | 13.2 | 38 |
| 4 | 7.67 | 0.38 | 11.8 | 10.80 | 12.90 | 30.9 |
| 5 | 4.13 | 1.74 | 11.39 | 3.90 | 6.00 | 52.3 |
| 6 | 6.55 | 0.26 | 10.34 | 1.70 | 1.80 | 48.4 |
| 7 | 8.29 | 0.20 | 17.43 | 0.23 |  | 30.6 |

TABLE 3

|  | Month 0 | Month 1 | Month 2 | Month 3 | Month 4 | Month 5 | Month 6 | Month 7 | Month 8 | Month 9 |
|---|---|---|---|---|---|---|---|---|---|---|
|  | Acidity levels: as g/l H2SO4 | | | | | | | | | |
| A.P. 1 | 40.3 | 12.5 | 33.0 | 28.8 | 27.2 | 20.8 | 20.8 | 30.5 | 26.8 | 33.3 |
| A.P. 2 | 46.0 | 21.3 | 27.6 | 13.3 | 24.8 | 22.2 | 7.6 | 7.9 | 11.1 | 18.2 |
| A.P. 3 | 30.2 | 34.7 | 24.8 | 17.3 | 14.8 | 20.1 | 12.4 | 15.9 | 12.3 | 18.2 |
|  | Weak acid chlorine levels g/l Cl | | | | | | | | | |
| A.P. 1 | 1.0 | 0.7 | 1.1 | 0.9 | 1.2 | 1.0 | 1.0 | 1.0 | 0.8 | 1.7 |
| A.P. 2 | 3.0 | 1.7 | 1.9 | 1.2 | 1.7 | 1.8 | 1.6 | 1.4 | 1.0 | 1.0 |
| A.P. 3 | 2.2 | 1.8 | 1.5 | 1.5 | 1.8 | 1.8 | 1.6 | 1.7 | 1.2 | 1.7 |

TABLE 4-continued

|  | % Zn | % Cd | % S | % Hg | % Se | % Pb |
|---|---|---|---|---|---|---|
| Special | | | | | | |
| 2 | 4.1 |  |  | 20 | 23.5 |  |
| 2 | 4.7 |  |  | 21 | 21.6 |  |
|  | Second filter press residue | | | | | |
| Month | | | | | | |
| 3 | 0.50 | 0.50 | 56.8 | <.001 | 43.20 | 3.6 |
| 4 | 0.80 | 0.94 | 48.3 | <.001 | 44.90 | 5.2 |
| 5 | 2.09 | 0.56 | 61.54 | 0.10 | 20.00 | 6.8 |
| 6 | 4.04 | 1.53 | 41.04 | 0.32 | 18.00 | 7.4 |
| 7 | 4.48 | 1.3 | 29.74 | 5 |  | 6.64 |

TABLE 4-continued

|  | % Zn | % Cd | % S | % Hg | % Se | % Pb |
|---|---|---|---|---|---|---|
| Special | | | | | | |
| 3 | 1.03 | 0.4 | 42.6 | 0.015 | 11.7 | 1.47 |
| 3 | 1.1 | | | | 30.8 | |
| 3 | 0.2 | | | 0.071 | 43.1 | |

Table 4 shows a comparison of the impurities collected in the first and second filter cakes, collected before and after the treatment with sodium sulfide and sodium dithionite.

This technique is novel in that the normally fragile sodium dithionite reagent, which tends to break down in a matter of a few seconds to sulfur dioxide and sodium sulfite when present in an oxidizing solution, may be used in high temperature conditions with the presence of various solids without requiring a high stoichiometric ratio of reagent to selenium. During the removal of the selenium and mercury, several other metals are also removed to significantly low levels as sulfide precipitates, including arsenic, lead, thallium, indium, gallium, and copper, as shown in Table 5. It should be noted that the quantity of reagents required is related to the operation of the gas cleaning step ahead of the scrubber circuit that produces the weak acid. The lower the acidity of the solution, due to dilution and leaching of the entrained dust, the more reagents are required. This is shown in FIG. 4, which indicates that lower levels of acid result in less efficient removal of selenium from solution, and that the final level of selenium remaining in solution after treatment is higher than for more acidic solutions.

TABLE 5

| Element | Concentration (mg/L) | |
|---|---|---|
| | Initial | Final |
| Arsenic | 6.44 | <0.25 |
| Cadmium | 94.94 | 12.62 |
| Copper | 14.13 | <0.02 |
| Gallium | 0.69 | <0.5 |
| Indium | 2.24 | <1.0 |
| Lead | 3.58 | <0.25 |
| Thallium | 1.17 | <0.25 |

Although the process of the present invention employs sodium sulfide and sodium dithionite in precipitating volatile impurities from weak acid solutions obtained by scrubbing hot gases released in the roasting of sulfide concentrates, it is also within the scope of the present invention to utilize other sulfides and dithionites, including, but not limited to sulfides and dithionites of potassium and other alkali metals, as well as zinc hydrosulfite. Further, although the process of the present invention is described in the context of processing weak acid solutions on an industrial scale, it is within the scope of this invention to utilize these techniques in a small-scale environment, such as for laboratory use. This invention is also not limited to the context of removing volatile impurities from acid solutions created from scrubbing gases produced in the sulfide concentrate roasting process, and from effluents produced by plants involved in roasting of sulfide concentrates, but also for removing such impurities from weak acids in general, regardless of the reason for the contamination.

Figure 9:
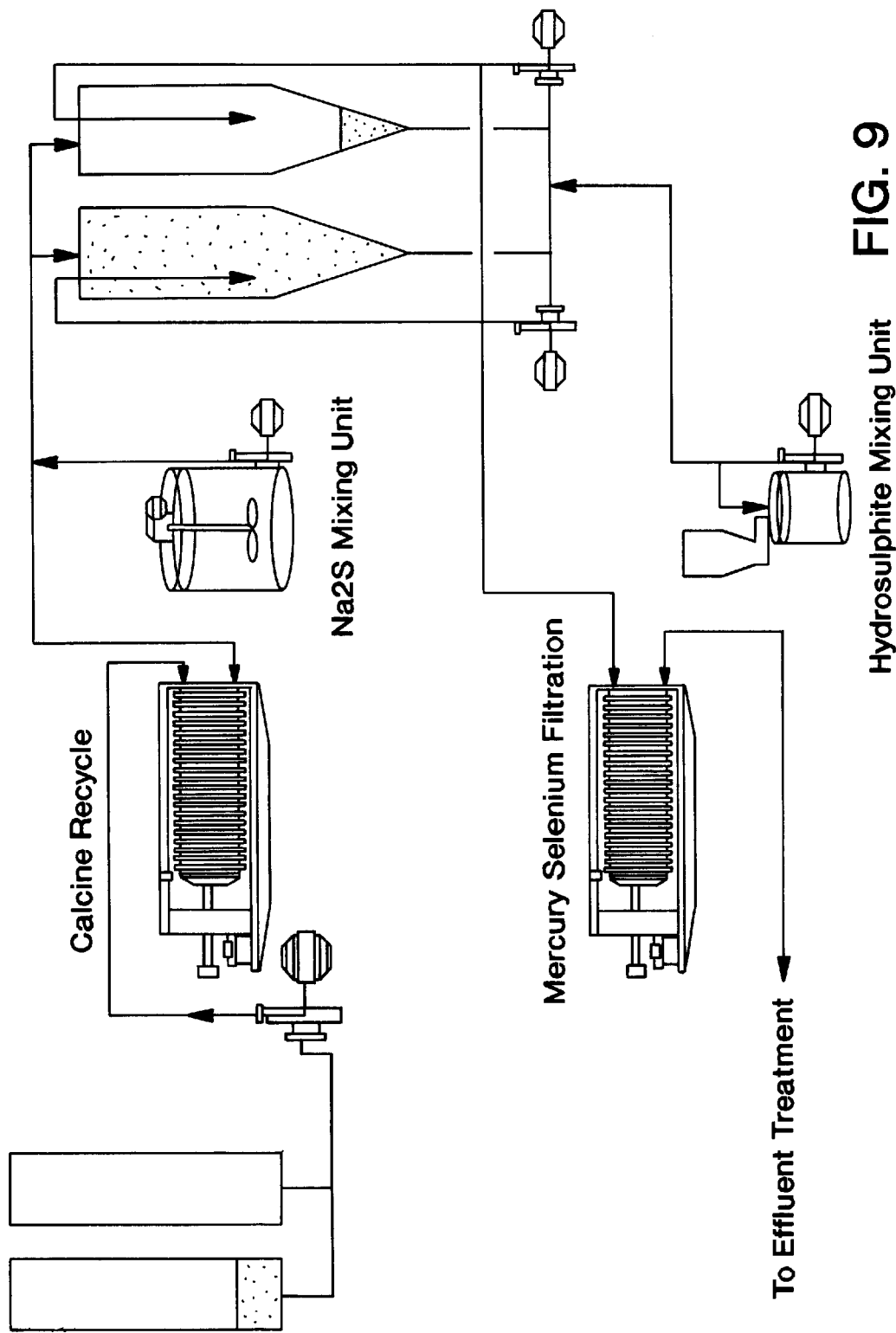
FIG. 9 is a schematic drawing of one of several different variations on the process according to the present invention for removing impurities from a weak acid solution.

One mode of operating an acid processing plant is shown in FIG. 9, which illustrates a possible layout for new acid processing plants according to the present invention. Various other plant design combinations can be used according to the present invention, and there are no limits to the possibilities for creating more efficient acid processing plants as envisioned by the present invention. These configurations present such options as including spare filtration units, optional recycling of calcine recovered from an initial filtration step, use of one or more separate reactor chambers, either in series or to be used alternatively for holding the acid after sodium sulfite and sodium dithionite have been mixed with the acid, and use of additional filters before passing the weak acid solution to waste water treatment. A plant design according to the present invention may incorporate any or all or none of the above optional design enhancements. A basic acid processing plant according to the present invention includes apparatus for processing a weak acid containing volatile impurities with sodium sulfite and sodium dithionite, and then filtering out the resulting precipitates.

EXAMPLE 1

In the first test, various stoichiometric amounts of sodium dithionite were added to a filtered weak acid solution containing selenium. The temperature of the reaction mixture was maintained at 50° C.

Prior to each addition of dithionite to the reaction mixture, the weak acid solution was sampled and filtered. These solutions were analyzed for selenium content by atomic adsorption, and for other elements by Induction Current Plasma analysis (ICP).

A gradual, linear decrease in the concentration of selenium to about 4 mg/L was noted after approximately three times the stoichiometric amount of sodium dithionite corresponding to the amount of selenium present in the solution had been added to the weak acid solution, as shown in FIG. 1. At 4.5 times the stoichiometric amount of sodium dithionite, the selenium present in the weak acid is precipitated to a value less than 1 mg/L, as shown in FIG. 1.

EXAMPLE 2

In the second test, an amount of sodium dithionite sufficient to precipitate stoichiometrically all of the selenium present in a filtered weak acid solution was added at half hour intervals. The temperature of the reaction mixture was maintained at room temperature, 25° C.

Prior to each addition of dithionite to the reaction mixture, the weak acid solution was sampled and filtered. These samples were analyzed for selenium content by atomic adsorption, and for other elements by ICP. The results of this test show that the selenium content was reduced from approximated 50 ppm to less than 1 mg/L using about 4.5 times the stoichiometric amount of sodium dithionite corresponding to the amount of selenium present in the solution, as shown in FIG. 2.

ICP analysis indicated that arsenic, copper, gallium, indium, lead and thallium levels were reduced below detectable limits.

EXAMPLE 3

In the third test, one half of the amount of sodium dithionite sufficient to precipitate stoichiometrically all of the selenium present in a filtered weak acid solution was added every 15 minutes. The temperature of the reaction mixture was maintained at room temperature, 25° C.

Prior to each addition of dithionite to the reaction mixture, the weak acid solution was sampled and filtered. These solutions were analyzed for selenium content by atomic adsorption, and for other elements by ICP. The results of this test show that the selenium content was reduced from approximated 50 ppm to less than 1 mg/L using about 4.5 times the stoichiometric amount of sodium dithionite corresponding to the amount of selenium present in the solution, as shown in FIG. 1.

ICP analysis indicated that arsenic, cadmium, copper, gallium, indium, lead and thallium levels were reduced below detectable limits. The concentration of cadmium decreased from 95 mg/L to 13 mg/L during this test.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for removing mercury and selenium impurities from an acidic scrubbing solution, comprising the steps of:

mixing the acidic scrubbing solution with sodium sulfide to precipitate mercury from the acidic scrubbing solution;

mixing the acidic scrubbing solution with sodium dithionite to precipitate selenium from the acidic scrubbing solution; and filtering mercury and selenium solids from the acidic scrubbing solution to form a selenium rich cake.

2. The process of claim 1, wherein the acidic scrubbing solution is processed in a calcine filtering unit to remove calcine solids from the acidic scrubbing solution before the impurities are removed.

3. The process of claim 1, wherein said filtering step utilizes multiple filtering units to filter solid impurities from the acidic scrubbing solution.

4. The process of claim 1, wherein additional trace elements are also precipitated from the acidic scrubbing solution.

5. The process of claim 1, wherein the acidic scrubbing solution has a temperature in the range of approximately 10 to 80° C.

6. The process of claim 1, wherein the acidic scrubbing solution has a pH in the range of approximately 1 to 6.

7. The process of claim 1, wherein the acidic scrubbing solution contains approximately 0 to 50 g/L of sulfuric acid.

8. The process of claim 1, wherein the acidic scrubbing solution has a solid content of approximately 0 to 10 g/L.

9. A process for removing selenium impurities from an acidic scrubbing solution comprising the steps of:

mixing the acidic scrubbing solution with sodium dithionite to precipitate selenium from the acidic scrubbing solution; and filtering solids from the acidic scrubbing solution to form a selenium rich cake.

10. A process for removing mercury and selenium impurities from an acidic scrubbing solution comprising the steps of:

mixing the acidic scrubbing solution with sodium sulfide to precipitate mercury and selenium from the acidic scrubbing solution;

mixing the acidic scrubbing solution with sodium dithionite to cause precipitation of selenium from the acidic scrubbing solution; and filtering solids from the acidic scrubbing solution.

11. A process for treating an acidic solution, resulting from scrubbing gases produced in a process for preparing sulfuric acid, to recover selenium, comprising the steps of:

mixing the acidic solution with sodium sulfide;

mixing the acidic solution with sodium dithionite to precipitate the selenium; and filtering the selenium from the acidic solution.

12. A process for recovering mercury and selenium from an acidic solution, resulting from scrubbing gases produced in roasting zinc calcine to prepare sulfuric acid, comprising the steps of:

filtering calcine from the acidic solution;

mixing the acidic solution with sodium sulfide;

mixing the acidic solution with sodium dithionite;

filtering mercury and selenium solids from the acidic solution; and sending the treated acidic solution to effluent treatment.

13. A process for removing selenium from an acidic scrubbing solution, used to scrub impurities from gas produced by roasting zinc calcine, comprising the steps of:

treating the solution with sodium sulfide to precipitate a first portion of the selenium;

treating the sodium sulfide treated solution with sodium dithionite to precipitate a second portion of selenium; and filtering the sodium dithionite treated solution to produce a cake containing the precipitated first and second portions of selenium.

* * * * *